July 7, 1925.
W. H. McCLELLAND
MOLD PLATE AND REPLACER
Filed Dec. 15, 1924
1,545,337
2 Sheets-Sheet 1
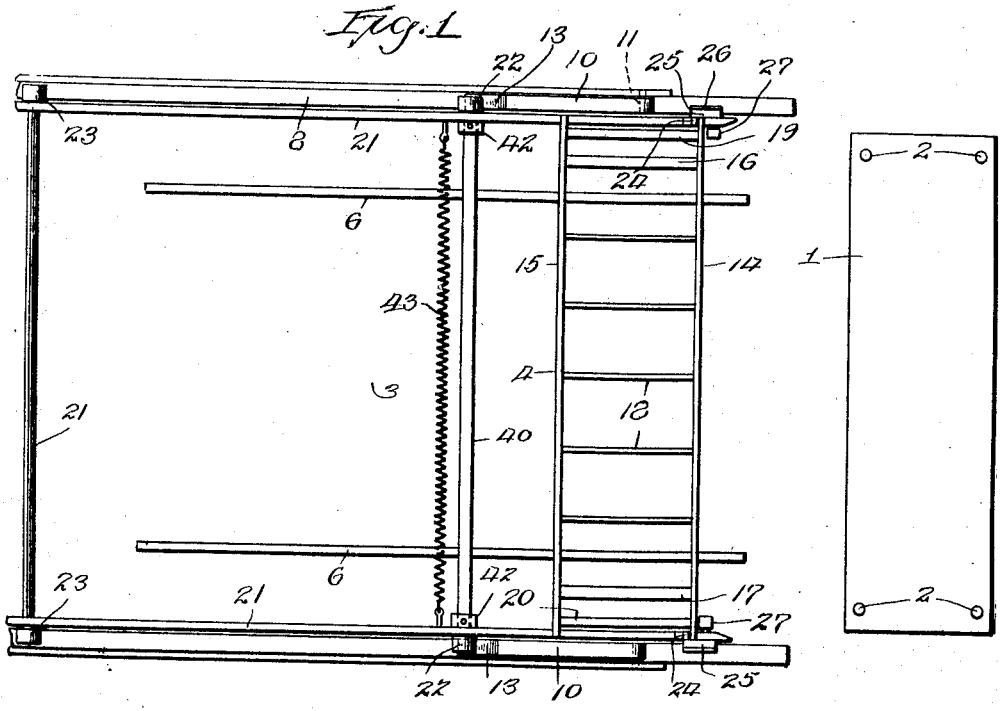
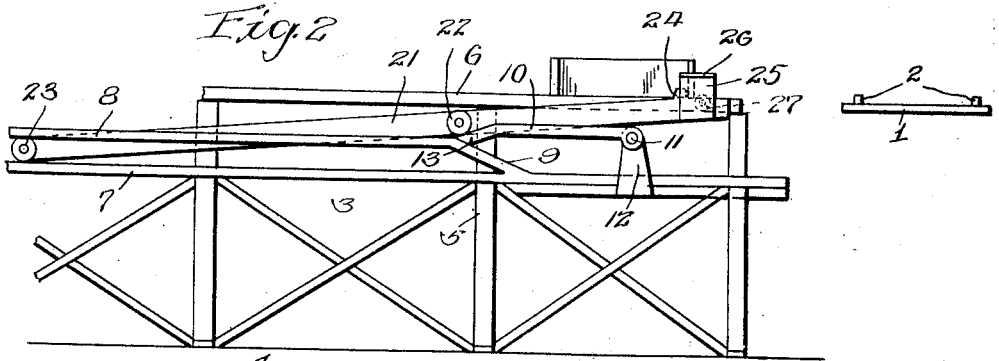
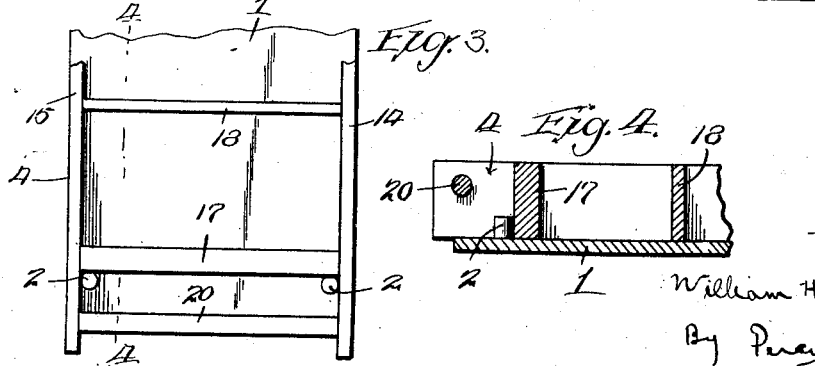
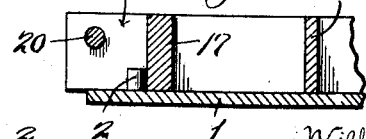

July 7, 1925.  
W. H. McCLELLAND  
MOLD PLATE AND REPLACER  
Filed Dec. 15, 1924  
1,545,337  
2 Sheets-Sheet 2
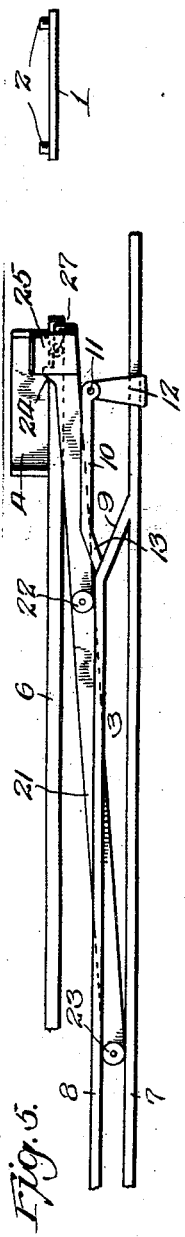
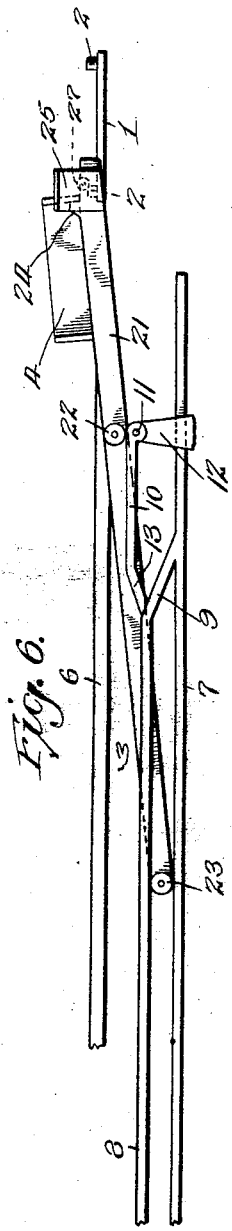
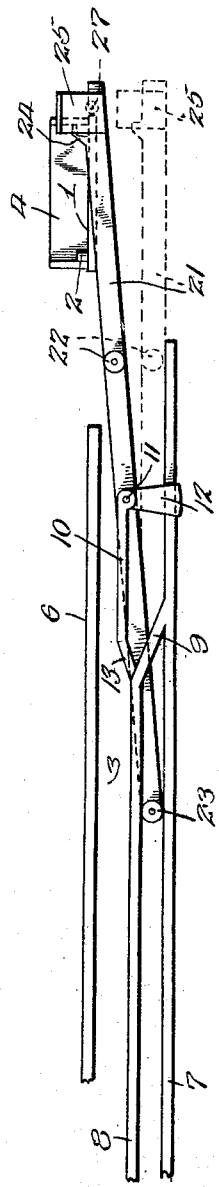
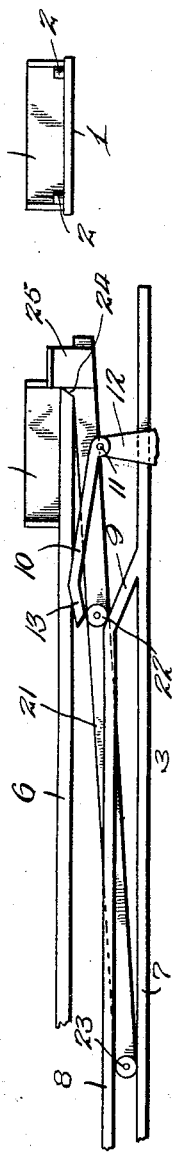
Inventor  
William H. McClelland  
By Percy H. Moore  
Atty.

Patented July 7, 1925.

1,545,337

UNITED STATES PATENT OFFICE.

WILLIAM H. McCLELLAND, OF HUNTINGDON, PENNSYLVANIA, ASSIGNOR, BY MESNE ASSIGNMENTS, TO ROY P. M. DAVIS, OF MOUNT UNION, PENNSYLVANIA.

MOLD PLATE AND REPLACER.

Application filed December 15, 1924. Serial No. 755,934.

*To all whom it may concern:*

Be it known that WILLIAM H. MCCLEL-LAND, a citizen of the United States of America, residing at Huntingdon, in the county of Huntingdon and State of Pennsylvania, has invented certain new and useful Improvements in Mold Plates and Replacers, of which the following is a specification.

My invention relates to mold plates and mold replacers for brick making machines.

In brick making machines of the type illustrated in the co-pending application of the assignee of record in this case R. P. M. Davis, Serial No. 576,298, filed July 20, 1922, which has become Patent #1,498,614, it is essential that the empty brick molds be placed on the mold supports or mold plates and maintained thereon against relative horizontal movement. The proper positioning of the mold on the plate by mechanical means is difficult due to the fact that the centering means employed for maintaining the mold against movement after the mold is placed on the plate, necessitates the elevation of the mold to clear the centering means in moving the mold to position on the plate. It is the object of my invention to accomplish the foregoing in a simple and efficient manner.

Other objects and advantages will be apparent from the following description when taken in connection with the accompanying drawings.

In the drawings:

Figure 1 is a plan view showing the mold on the mold tables;

Figure 2 is a side elevation of the same;

Figure 3 is a fragmentary plan view showing the mold in final position on the mold plate;

Figure 4 is a detail section on the line 4—4 of Figure 3; and

Figures 5, 6, 7, and 8 are side elevations showing the various positions assumed by the mold.

Referring more specifically to the drawings, 1, denotes a mold plate, supported by the reciprocating carriage (not shown) of a brick making machine (also not shown). This plate 1, is provided with four upwardly projecting pins or studs 2, one adjacent each corner of the face of the plate, for a purpose hereinafter referred to.

A mold delivery station 3, is arranged adjacent the path of movement of the mold plate 1, and when the plate 1, arrives opposite the station as illustrated in Figure 1, the mold 4, hereinafter more specifically described, is pushed upon the plate in a manner also to be presently described.

The mold delivery station 3, comprises a table or supporting frame-work 5, upon which are suitably mounted spaced parallel skid tracks 6, upon which the mold 4, rests before being transferred to the mold plate 1. Mounted upon the table 5, at each side thereof is a rail 7. And directly above and parallel with each rail 7, is a rail 8, having a downwardly inclined forward end 9, which is secured to the rail 7, adjacent the forward end of the latter. Short rails 10, parallel to and slightly above the rail 8, are pivotally mounted at each end on stub shafts 11 mounted in brackets 12, on the table 5. The free ends 13, of these pivoted rails 10, are downwardly inclined and rest by gravity on the downwardly inclined ends 9, of the rails 8, at the topmost part of said inclined ends.

The molds 4, which are fed to the skid tracks 6, by any suitable means (not shown) are of skeleton formation, comprising side walls 14 and 15, end walls 16 and 17, partitions 18, and end braces 19 and 20. After a mold has been placed on the skid tracks 6, and the mold plate 1, has arrived at a point opposite the mold delivery station 3, the mold is manually or otherwise pushed forwardly along the rails by means of pusher bars 21. These pusher bars carry spaced forward and rear rollers 22 and 23 on their outer sides which respectively ride on the upper rails 8, and lower rails 7, previously referred to, thus slidably supporting the pusher bars in an upwardly and forwardly inclined position.

The rollers 22 and 23 are respectively mounted on the outer ends of shafts 40 and 21, which connect the pusher bars and pass therethrough. Stop collars 42, are fixed to the shaft 40, adjacent to the inner sides of the pusher bars, and the latter are pulled inwardly towards each other and against the stop collars by a spring 43, connected at opposite ends to the pusher bars. This spring tends to center the mold with the mold plate as will later appear.

The pusher bars are formed with upwardly projecting lugs 24, on their upper edges, adjacent the forward extremities of the bars, and guide plates 25 having outwardly bent portions 26, are secured to the outer sides of the bars adjacent said extremities. Rollers 27, are secured to the inner sides of the pusher bars, slightly in advance of the lugs 24. The initial forward movement of the pusher bars causes the guide plates 25, to engage the ends of side wall 4, of the mold as best illustrated in Figure 1, thereby centering the mold on the skid tracks 6, relatively to the mold plate 1. Further forward movement of the pusher arms causes the lugs 24, to engage behind the forward wall 4, of the mold as illustrated in Figure 2. The forward rollers 22, now ride up the inclined ends 13, of the pivoted rails 10, thus tilting the mold and finally lifting it off the skid tracks 6, to Figure 6 position. A very slight additional forward movement of the pusher bars causes the rollers 22, to ride off the forward pivoted ends of the tracks 10, thereby permitting the rollers 27, to drop down upon the end edges of the plate 1. The mold is now supported in tilted position by the rollers 27 resting on plate 1, and the rollers 23, on rails 7. As the mold is advanced from Figure 6 to Figure 7 position, its forward side is tilted at such an elevation that it rides over the first or inner set of pins or studs 2, and then over the second or outer set, the rear side of the mold dragging over the plate during this final movement until it engages and is stopped by the first set or row of pins 2. The rollers 27, at this point in the forward movement of the pusher bars ride off the outer edge of the mold plate 1 and the forward side of the mold drops down over the outer set or row of pins 2. The spacing between the respective sets or rows of pins 2, is such that they snugly engage the inner face of the respective sides of the mold and lock the mold against relative movement with respect to the plate.

When the rollers 27, ride off the outer edge of the plate 1, the pusher bars drop to dotted line position Figure 7, with both rollers 22 and 23 resting on the rails 8. The pusher bars are now retracted by any suitable means (not shown) to approximately Figure 2 position. During this return movement the rollers 22 will ride up the inclined ends 9 of the rails 8, lifting up the inclined ends of the pivoted rails 10, and passing thereunder onto the horizontal portions of the said rails 8. Assuming that a fresh mold 4, has been placed on the skid tracks 6, and that an unoccupied mold plate has arrived opposite the delivery station 3, the cycle of operation just described is repeated.

Having thus described my invention what I claim is:

1. In combination a table having means adapted to support thereon a skeleton brick mold, a mold plate, and means for bodily lifting said mold from said first mentioned means and depositing said mold on said mold plate.

2. In combination a table having skid tracks adapted to support thereon a skeleton brick mold, a mold plate arranged adjacent the table, means for lifting said mold from said tracks and depositing said mold in superposed position on said mold plate.

3. As an article of manufacture, a rectangular mold plate for rectangular skeleton brick mold, having side and end walls, said plate having upwardly projecting studs adjacent its four corner edges adapted to engage the inner faces of the side walls of the mold when said mold is placed in superposed position on said mold plate.

4. In a device of the character described, a table having skid tracks adapted to support thereon a skeleton mold, a mold plate adjacent said table, said mold plate having mold locking means thereon, a pair of reciprocating pusher bars, and means for directing said pusher bars upwardly beneath said molds to cause said arms to lift said mold from said tracks and move the mold over said locking means to superposed position on said mold plate.

5. In a device of the character described, a table having skid tracks adapted to support thereon a skeleton mold, a mold plate, a pair of reciprocating pusher bars for transferring said mold to said mold plate, upper and lower guide rails for directing said bars upwardly beneath said mold, said bars having forward and rear rollers adapted to ride over said upper and lower rails respectively during the forward movement of said bars for the purpose described.

In testimony whereof I affix my signature in presence of two witnesses.

WILLIAM H. McCLELLAND.

Witnesses:
 MARY W. SHAVER,
 M. R. WILSON.